United States Patent Office 3,290,317
Patented Dec. 6, 1966

3,290,317
1-(N-ARYL-N-ALKANOYLAMINOALKYL)-4-ARYL-4-PIPERIDINOLS AND THEIR ESTERS
Philip M. Carabateas, East Greenbush, N.Y., assignor to Sterling Drug Inc., New York, N.Y., a corporation of Delaware
No Drawing. Filed Mar. 7, 1960, Ser. No. 12,909
21 Claims. (Cl. 260—293.4)

This invention relates to compositions of matter known in the art of chemistry as substituted-piperidines, to processes for making such compositions, to intermediates for use in such processes and to a process for preparing said intermediates.

Piperidines having a wide variety of aryl and lower-carboxylic-acyloxy or hydroxy substitutents attached to the 4-position carbon atom of the piperidine ring are known in the art. Such substituted piperidines are also known in which one or more lower-aliphatic hydrocarbon radicals are attached to other carbon atoms of the piperidine ring. Piperidines so substituted are known having various radicals attached to the nitrogen atom of the piperidine ring, such as alkyl, aralkyl, aralkenyl, aryloxyalkyl and arylmercaptoalkyl, such compounds being shown for example in U.S. Patents 2,850,500 and 2,880,211.

It is an object of the present invention to provide useful compositions of the aforesaid substituted-piperidines having a novel combination of substituents attached to the 1- and 4-positions of the piperidine ring.

The present invention, in its composition aspect, is described as residing in the concept of a composition having a molecular structure in which an N-(lower-aromatic)-N - (lower - carboxylic - aryl)amino - (polycarbon-lower-alkyl) substituent is attached to the nitrogen atom (or 1-position) of 4-hydroxy-4-(lower-aryl)-piperidines and 4-(lower-carboxylic acyloxy) - 4-(lower-aryl)-piperidines, the piperidine ring-carbon atoms of which are optionally substituted by lower-aliphatic hydrocarbon radicals.

The physical embodiments of my invention have been tested by standard pharmacological evaluation procedures in rats and found to possess analgesic activity.

The term "lower-carboxylic-acyl," as used herein, means carboxylic acyl radicals having from two to seven carbon atoms, inclusive, and is illustrated by ethanoyl (acetyl), propanoyl (propionyl), n-butanoyl (butyryl), 2-methylpropanoyl, n-pentanoyl, n-hexanoyl, n-heptanoyl, 2-propenoyl (acrylyl), n-propoxyacetyl, 3-methoxypropanoyl, 3-carboxypropanoyl, 4-carboxybutanoyl, and the like.

The term "lower-aryl," i.e., mono- and bi-cyclic aryl, as used herein, means aryl radicals of the benzene or naphthalene series, as defined and illustrated herein below as part of the term "lower-aromatic."

The term "lower-aromatic," i.e., mono- and bi-cyclic aromatic, as used herein, means radicals having one or two aromatic rings which can be benzenoid or five- or six-membered heteroaromatic, as illustrated by phenyl, naphthyl, biphenylyl, pyridyl, pyrimidyl, furyl thiazolyl, oxazolyl, triazinyl, thienyl, and the like. Preferred embodiments have as "lower-aromatic" monocarbocyclic-aryl radicals having six ring-carbon atoms, that is, aryl radicals of the benzene series. These embodiments, which are preferred primarily because of their commercial practicability due to availability of intermediates, include compounds where "lower-aromatic" is the unsubstituted phenyl radical and phenyl radicals substituted by low-molecular weight substituents such as lower-alkyl, lower-alkoxy, lower-alkylmercapto, lower-alkylsulfinyl, lower-alkylsulfonyl, halo, lower-alkylamino, di-(lower-alkyl)amino, nitro, amino, lower-carboxylic-acylamino, trifluoromethyl, phenoxy, benzyloxy, hydroxy, phenylmercapto, benzyl, 4-methoxyphenoxy, and the like. The substituted phenyl radicals have preferably from one to three substituents which can be in any of the available positions of the phenyl nucleus, and where more than one substituents is present, they can be the same or different and they can be in any of the various position, combinations relative to each other. The lower-alkyl, lower-alkoxy, lower-alkylmercapto, lower-alkylsulfinyl, lower-alkylsulfonyl, lower-alkylamino, lower-carboxylic acylamino, and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, and the like.

The term "polycarbon-lower-alkylene" or "substituted-polycarbon-lower-alkyl," as used herein, means alkylene radicals having from two to six carbon atoms, inclusive, and is illustrated by

—CH₂CH₂—, —CH(CH₃)CH₂—, —CH₂CH₂CH₂CH₂—

—CH₂CH₂CH₂CH₂CH₂—, —CH₂ĊHCH₃

—CH₂CH₂CH₂—, —C(CH₃)₂CH₂—, —CH₂ĊHCH₂CH₃
—CH(CH₃)CH₂CH₂—, —CH₂CH₂CH₂CH₂CH₂— and the like.

Embodiments of my invention in its composition-aspect that are preferred because of their commercial practicability due to availability of intermediates are the compounds having in free base form the structural Formula I

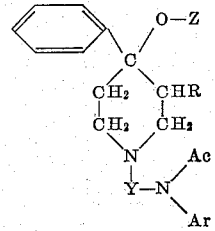

(I)

where Z represents hydrogen or lower-alkanoyl, R represents hydrogen or lower-alkyl, Y represents polycarbon-lower-alkylene, Ac represents lower-alkanoyl and Ar represents monocarbocyclic aryl having six ring-carbon atoms.

The invention, in its process aspect, is described as residing in the concept of reacting a 4-(lower-aryl)-1-[(lower-aromatic-amino) - (polycarbon-lower-alkyl)]-4-piperidinol with one molar equivalent quantity of a lower-carboxylic-acylating agent to prepare a 1-[N-(lower-aromatic) - N - (lower-carboxylic-aryl)amino-(polycarbon-lower alkyl)]-4-(lower-aryl) - 4 - piperidinol or with two molar equivalent quantities of a lower-carboxylic-acylating agent to prepare the corresponding ester, that is, a 4-(lower-carboxylic-acyloxy)-1-[N-(lower-aromatic) - N - (lower-carboxylic-acyl)amino - (polycarbon-lower-alkyl)]-4-(lower-aryl)-piperidine. A lower-carboxylic acid anhydride or halide is used as the lower-carboxylic-acylating agent, with the anhydride preferably used in the preparation of the ester. The reactions are carried out using one or two molar equivalent quantities of the acylating agent and substituted-piperidinol, preferably with but optionally without an inert solvent such as chloroform, benzene, toluene, ethyl acetate, and the like. Monoacylation to prepare said substituted-4-piperidinol procedes readily by mixing the reactants at room temperature. Diacylation to prepare said ester is best accomplished by warming the substituted-4-piperidinol with two molar equivalent quantities of the acyl anhydride in the presence or absence of an inert solvent;

or alternatively it can be carried out at room temperature or at higher temperatures up to about 150° C. Alternatively, the diacylation can be carried out using two molar equivalent quantities of an acyl halide in the presence of at least one molar-equivalent quantity of an acid-acceptor, e.g., sodium hydroxide, potassium hydroxide, sodium carbonate, potassium carbonate, sodium acetate, sodium ethoxide, sodium amide, trimethylamine, etc., to take up the second molar equivalent of hydrogen halide formed by the reaction, the first being taken up by the nitrogen atom of the piperidine ring. Alternatively, the monoacylated product can be formed by acid hydrolysis of the diacylated compound to remove the 4-acyl grouping, e.g., by reacting the diacylated compound with a strong inorganic acid (e.g., HCl, HBr, $H_2SO_4$) in an aqueous medium, as illustrated hereinbelow. Diacylated compounds having different acyl groupings at the N-atom of the 1-substituent and at the O-atom at the 4-position can be prepared by stepwise reaction of the intermediate 4-(lower-aryl)-4-piperidinol first with one molar equivalent quantity of one acylating agent and then by reaction of the N-acylated compound with a molar equivalent quantity of a second acylating agent.

My 1 - [N-(lower-aromatic)-N-(lower-carboxylic-acyl) amino(polycarbon-lower-alkyl)] - 4 - (lower-aryl)-4-piperidinols and corresponding 4-(lower-carboxylic-acyl) esters are useful in the free base form or in the form of acid-addition salts; and both forms are within the purview of the invention, and, in fact, are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to form the hydrochloride salt. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, critic acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, sulfate, acetate, citrate, tartrate, lactate, methanesulfonate, ethanesulfonate, benzenesulfonate, p-toluenesulfonate, and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

Also encompassed by my invention are quaternary-ammonium salts of the aforesaid 1-[N-(lower-aromatic)-N - (lower-carboxylic-acyl)amino(polycarbon-lower-alkyl)]-4-(lower-aryl)-4-piperidinols and corresponding 4-(lower-carboxylic-acyl) esters. These salts are useful for further identification of the aforesaid basic piperidinols and esters. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benyl chloride, benzyl bromide, and substituted benzyl halides, such as p-chlorobenzyl chloride, p-nitrobenzyl chloride, o-chlorobenzyl chloride, p-methoxybenzyl chloride, and the like. The quaternary ammonium salts are prepared by mixing the free base and the alkyl, alkenyl or aralkyl esters in an organic solvent inert under the conditions or reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Another aspect of my invention resides in my intermediates in the form of their free bases and their acid-addition salts, and, also, in their preparation. The invention, in its intermediate composition aspect, is described as residing in the concept of a composition having a molecular structure in which a (lower-aromaticamino)-(polycarbon-lower-alkyl) substituent is attached to the 1-position of 4-(lower-aryl)-4-piperidinols. These intermediate embodiments are prepared by reacting a 4-(lower-aryl)-4-piperidinol with a (lower-aromatic-amino)-(polycarbon-lower-alkyl) ester of a strong inorganic acid or an organic sulfonic acid, said ester preferably being a halide, e.g., bromide, chloride, iodide. The reaction is preferably carried out by heating the reactants, preferably with, and optionally without, an appropriate solvent inert under the reaction conditions, e.g., chloroform, n-butanol, at a temperature between about 50° C. and 150° C. Also within the purview of the intermediate composition aspect of the invention are acid-addition salts of the above-said 1-[(lower-aromatic-amino) - (polycarbon-lower-alkyl)] - 4- (lower-aryl)-4-piperidinols, said salts being like those defined and illustrated above for the corresponding final products, i.e., the mono- and di-acylated compounds.

The molecular structures of the final products and intermediates of my invention are established by their mode of synthesis and corroborated by the correspondence of calculated and found values for the elementary analyses for representative examples.

The following examples will further illustrate the invention without, however, limiting it thereto.

EXAMPLE 1

*4-phenyl-1-[2-(N-phenylpropionamido)ethyl]-4-piperidinol hydrochloride*

To a mixture containing 14.8 g. of 4-phenyl-1-(2-phenylaminoethyl)-4-piperidinol, 75 cc. of ethylene dichloride and 25 cc. of water were added simultaneously with stirring over a period of about 10 minutes 16 cc. of 35% aqueous sodium hydroxide solution and 14 cc. of propionic anhydride, the temperature of the reaction mixture rising to about 40° C. The reaction mixture was then stirred for an additional two hours. The ethylene dichloride layer was separated, washed three times with water and dried over anhydrous sodium sulfate. The solvent was removed by distilling in vacuo, the remaining material was disolved in isopropyl alcohol, and the resulting solution was acidified with concentrated hydrochloric acid. The mixture was cooled and the solid that separated was collected and recrystallized from isopropyl alcohol to yield the white crystalline product, 4-phenyl- 1-[2-(N-phenylpropionamido)ethyl]-4-piperidinol hydrochloride, M.P. 166.9–172.6° C. (corr.).

Analysis.—Calcd. for $C_{22}H_{28}N_2O_2 \cdot HCl$: N, 7.20; O, 8.23. Found: N, 9.96; O, 8.25.

4 - phenyl - 1 - [2 - (N - phenylpropionamido)ethyl]-4-piperidinol is obtained in its free base form by dissolving the hydrochloride salt in water, treating the solution with aqueous soidum hydroxide solution, extracting the liberated basic product with benzene, drying the benzene extract over anhydrous sodium sulfate and removing the benzene by distilling in vacuo. The free base can then be reacted with various acids, e.g., hydrobromic acid, hydriodic acid, hydrofluoric acid, sulfuric acid, sulfamic acid, citric acid, methanesulfonic acid, ethanesulfonc acid, benzenesulfonic acid or quinic acid to give, respectively, the hydrobromide, hydriodide, hydrofluoride, sulfate, sulfamate, citrate, methanesulfonate, ethanesulfonate, benzenesulfonate or quinate salts of 4-phenyl-1-[2-(N-phenylpropionamido)ethyl]-4-piperidinol. Any other acid-addition salt can be prepared similarly using the desired acid. The free base can also be reacted with various esters as described above, e.g., methyl sulfate, allyl chloride or benzyl bromide, to give, respectively, the methosulfate, allochloride or benzobromide of 4-phenyl-1-[2-(N-phenylpropionamido)ethyl]-4-piperidinol.

The hydrofluoride salt of 4-phenyl-1-[2-(N-phenylpropionamido)ethyl]-4-piperidinol can be converted to the hydrochloride salt by passing it through an ion exchange resin saturated with chloride ion.

Additional 4-phenyl-1-[2-(N-phenyl-N-alkanoylamino) ethyl]-4-piperidinols are obtained following the above procedure but using other alkanoic anhydrides in place of propionic anhydride. For example, using 2-methylpropanoic anhydride, n-pentanoic anhydride or n-hexanoic anhydride, there are obtained 4-phenyl-1-[2-(N-phenyl-N - [2 - methylpropanoyl]amino)ethyl] - 4 - piperidinol, 4 - phenyl - 1 - [2 - (N - phenyl - N - [n-pentanoyl] amino)ethyl] - 4 - piperidinol or 4 - phenyl - 1 - [2 - (N-phenyl - N - [n - hexanoyl]amino)ethyl] - 4 - piperidinol, respectively. These products can be isolated in their free base form or in the form of their acid-addition salts, preferably the hydrochloride.

Pharmacological evaluation of 4-phenyl-1-[2-(N-phenylpropionamido)ethyl] - 4 - piperidinol hydrochloride in aqueous solution administered to rats subcutaneously using the D'Amour-Smith method has shown that this compound is about forty-seven times as potent an analgesic as meperidine hydrochloride on a molar basis in terms of the bases.

The intermediate 4-phenyl - 1 - (2 - phenylaminoethyl)-4-piperidinol was prepared as follows: a mixture containing 70 g. of 4-phenyl-4-piperidinol, 116.5 g. of 2-phenylaminoethyl bromide hydrobromide, 115 cc. of triethylamine and 750 cc. of dry chloroform was refluxed with stirring for eight hours. The reaction mixture was then cooled, washed three times with water, dried over anhydrous sodium sulfate and the solvent removed by distilling in vacuo. The residual material was dissolved in 200 cc. of isopropyl alcohol, two equivalents of concentrated hydrochloric acid were added and the resulting mixture was concentrated to dryness by distilling in vacuo. The residue was dissolved in 150 cc. of warm isopropyl alcohol and the resulting solution was allowed to stand in a refrigerator for several days. The solid that separated was collected, washed with acetone and dried at 70° C. There was thus obtained 80 g. of 4-phenyl-1-(2-phenylaminoethyl)-4-piperidinol hydrochloride, M.P. 154–159° C. The hydrochloride salt was converted to the base as follows: the salt was dissolved in water, the aqueous solution treated with aqueous sodium hydroxide solution, the liberated basic product extracted with benzene, the benzene extract dried over anhydrous sodium sulfate, the benzene removed by distilling in vacuo and the residual material crystallized from benzene-n-hexane to yield 57 g. of 4-phenyl-1-(2-phenylaminoethyl)-4-piperidinol M.P. 102–105° C.

A portion of the above basic intermediate was reconverted into its hydrochloride salt for analytical purposes as follows: 7.4 g. of the base was dissolved in 50 cc. of isopropyl alcohol and 4.2 cc. of concentrated hydrochloric acid added. The resulting mixture was concentrated in vacuo to dryness, the residue dissolved in 75 cc. of isopropyl alcohol by warming the mixture on a steam bath and the resulting solution cooled overnight in a refrigerator. The solid precipitate was collected, recrystallized from ethanol-ether and dried for four days at 70° C. to yield 7 g. of 4-phenyl-1-(2-phenylaminoethyl)-4-piperidinol hydrochloride, M.P. 157.6–159.4° C. (corr.) with decomposition.

Analysis.—Calcd. for $C_{19}H_{24}N_2O \cdot 2HCl$: Cl, 19.2; O, 4.33. Found: Cl, 19.15; O, 4.37.

Additional intermediate 1-[(lower-aromatic-amino)-(polycarbon - lower - alkyl) - 4 - (lower - aryl) - 4 - piperidinols that are obtained following the above procedure for the preparation of 4-phenyl-1-(2-phenylaminoethyl)-4-piperidinol using the appropriate 4-(lower-aryl)-4-piperidinol and (lower-aromatic-amino) - (polycarbon-lower-alkyl) ester, preferably bromide, are the following 1-[2-(2-methoxyphenylamino)ethyl]-4-phenyl-4-piperidinol,
1-[2-(3-ethoxyphenylamino)ethyl]-4-phenyl-4-piperidinol,
4-phenyl-1-[2-(3,4,5-trimethoxyphenylamino)ethyl]-4-piperidinol,
1-[2(2,4-dimethylphenylamino)ethyl]-4-phenyl-4-piperidinol,
1-[3-(2-chloro-4-ethoxyphenylamino)propyl]-4-phenyl-4-piperidinol,
10[2-(4-chlorophenylamino)ethyl]-4-phenyl-4-piperidinol,
1-[2-(4-n-butylaminophenylamino)ethyl]-4-phenyl-4-piperidinol,
1-[2-(4-methylmercaptophenylamino)ethyl]-4-phenyl-4-piperidinol,
4-phenyl-1-[3-(4-n-propylsulfinylphenylamino)propyl]-4-piperidinol,
1-[2-(4-n-butylsulfonylphenylamino)ethyl]-4-phenyl-4-piperidinol,
1-[2-(4-acetylaminophenylamino)ethyl]-4-phenyl-4-piperidinol,
1-[2-(2-naphthylamino)ethyl]-4-phenyl-4-piperidinol,
1-[2-(1-biphenylylamino)ethyl]-4-phenyl-4-piperidinol,
1-[3-(2-furylamino)propyl]-4-phenyl-4-piperidinol,
4-phenyl-1-[2-(4-pyridylamino)ethyl]-4-piperidinol,
4-phenyl-1-[2-(3-pyridylamino)ethyl]-4-piperidinol,
4-phenyl-1-[3-(2-thienylamino)propyl]-4-piperidinol,
4-phenyl-1-[2-(2-pyrimidylamino)ethyl]-4-piperidinol,
4-phenyl-1-[2-(2-thiazolylamino)-ethyl]-4-piperidinol,
4-phenyl-1-(4-phenylaminobutyl)-4-piperidinol,
4-phenyl-1-(5-phenylaminopentyl)-4-piperidinol,
4-phenyl-1-(6-phenylaminohexyl)-4-piperidinol,
4-phenyl-1-(2-phenylaminopropyl)-4-piperidinol,
4-phenyl-1-(3-phenylamino-2-propyl)-4-piperidinol,
1-[2-(4-nitrophenylamino)ethyl]-4phenyl-4-piperidinol,
1-[2-(4-aminophenylamino)ethyl]-4-phenyl-4-piperidinol,
1-[2-(2-oxazolylamino)ethyl]-4-phenyl-4-piperidinol,
4-phenyl-1-[3-(2-triazinylamino)propyl]-4-piperidinol,
4-phenyl-1-[2-(2-pyridylamino)ethyl]-4-piperidinol,
4-phenyl-1-[2-(3-trifluoromethylphenylamino)ethyl]-4-piperidinol,
4-phenyl-1-[2-(4-phenoxyphenylamino)ethyl]-4-piperidinol,
1-[2-(3-benzyloxyphenylamino)ethyl]-4-phenyl-4-piperidinol,
1-[2-(3-hydroxyphenylamino)ethyl]4-phenyl-4-piperidinol,
4-phenyl-1-[3-(4-phenylmercaptophenylamino)propyl]-4-piperidinol, 1-[2-(4-benzylphenylamino)ethyl]-4-phenyl-4-piperidinol,
4-(2-naphthyl)-1-(2-phenylaminoethyl)-4-piperidinol,
4-(3-methoxyphenyl)-1-(3-phenylaminopropyl)-4-piperidinol,
1-(3-phenylaminopropyl)-4-p-tolyl-4-piperidinol,
1-[2-(4-dimethylaminophenylamino)ethyl]-4-phenyl-4-piperidinol, and the like.

These intermediates can be isolated in their free base form, as illustrated above, or in the form of their acid-addition salts, preferably their hydrochlorides.

EXAMPLE 2

*4-phenyl-1-[2-(N-phenyl-N-[n-butanoyl]amino)ethyl]-4-piperidinol hydrochloride*

To a solution containing 2.96 g. of 4-phenyl-1-(2-phenylaminoethyl)-4-piperidinol dissolved in 10 cc. of chloroform was added dropwise over a period of about five minutes a solution containing 1.06 g. of n-butanoyl chloride dissolved in 5 cc. of chloroform. The mixture was allowed to stand for one hour and the solvent was then removed by distilling in vacuo on a steam bath. Ether was added to the residual oily material which changed to a gummy material and then to a white solid when triturated with fresh ether. The solid was recrystallized several times from ethyl acetate-methanol to yield 2.7 g. of 4-phenyl-1-[2-(N-phenyl-N-[n-butanoyl]amino)ethyl]-4-piperidinol hydrochloride, M.P. 156.6–162.8° C. (corr.).

*Analysis.*—Calcd. for $C_{23}H_{30}N_2O_2 \cdot HCl$: C, 68.55; H, 7.76; Cl, 8.80. Found: C, 68.79; H, 8.03; Cl, 8.95.

Pharmacological evaluation of 4-phenyl-1-[2-(N-phenyl-N-[n-butanoyl]amino)ethyl]-4-piperidinol hydrochloride in aqueous solution administered to rats subcutaneously using D'Amour-Smith method has shown that this compound is about thirty-two times as potent an analgesic as merperidine hydrochloride on a molar basis in terms of bases.

EXAMPLE 3

*4-phenyl-1-[3-(N-phenylpropionamido)propyl]-4-piperidinol hydrochloride*

The preparation was carried out following procedure described in Example 2 using 3.1 g. of 4-phenyl-1-(3-phenylaminopropyl)-4-piperidinol in 10 cc. of chloroform and 0.93 g. of propionyl chloride in 5 cc. of chloroform. There was thus obtained 2.1 g. of 4-phenyl-1-[3-(N-phenylpropionamido)propyl]-4-piperidinol hydrochloride, M.P. 135.2–136.4° C. (corr.).

*Analysis.*—Calcd. for $C_{23}H_{30}N_2O_2 \cdot HCl$: Cl, 8.80; N, 6.95. Found: Cl, 8.74; N, 6.87.

Pharmacological evaluation of 4-phenyl-1-[3-(N-phenylpropionamido)propyl]-4-piperidinol hydrochloride in aqueous solution administered to rats subcutaneously using the D'Amour-Smith method has shown that this compound is about three times as potent an analgesic as meperidine hydrochloride on a molar basis in terms of bases.

EXAMPLE 4

*4-phenyl-1-[3-(N-phenyl-N-[n-butanoyl]amino)propyl]-4-piperidinol hydrochloride*

This preparation was carried out following the procedure described in Example 2 using 7.0 g. of 4-phenyl-1-(3-phenylaminopropyl)-4-piperidinol in 15 cc. of chloroform and 2.42 g. of n-butanoyl chloride in 10 cc. of chloroform. There was thus obtained 2.2 g. of 4-phenyl-1-[3-(N-phenyl-N-[n-butanoyl]amino)propyl]-4-piperidinol hydrochloride, M.P. 118.8–120.2° C. (corr.) when recrystallized once from acetonitrile and once from acetone.

*Analysis.*—Calcd. for $C_{24}H_{32}N_2O_2 \cdot HCl$: C, 69.14; H, 7.98; Cl, 8.30. Found: C, 69.06; H, 8.06; Cl, 8.70.

EXAMPLE 5

*3-methyl-4-phenyl-1-[2-(N-phenylpropionamido)ethyl]-4-piperidinol p-toluenesulfonate*

A mixture containing 7.64 g. of 3-methyl-4-phenyl-4-piperidinol, 11.3 g. of 2-phenylaminoethyl bromide hydrobromide, 50 cc. of chloroform and 6 g. of triethylamine was refluxed for 10 hours. The solvent was removed by distilling in vacuo; the remaining oily material was made basic with 35% aqueous sodium hydroxide solution; and the alkaline solution was extracted with benzene. The benzene extract was washed with water, dried over anhydrous sodium sulfate and concentrated in vacuo to remove the solvent. The remaining oil was taken up in ether and the resulting mixture was filtered to remove some insoluble material. The filtrate was concentrated in vacuo to remove the ether, thereby yielding, as an oil, the intermediate 3-methyl-4-phenyl-1-(2-phenylaminoethyl)-4-piperidinol.

To this intermediate was added 5.4 g. of propionic anhydride and the resulting solution was heated for three hours on a steam bath. The reaction mixture was cooled, made basic with dilute aqueous sodium hydroxide solution and extracted with benzene. The benzene extract was washed with water, dried over anhydrous sodium sulfate and concentrated in vacuo to remove the benzene. The remaining oil was taken up in ether; the ether solution was filtered; and to the filtrate was added a solution of hydrogen chloride in ether to yield a white gummy material which could not be crystallized. The gum was then made basic with 35% aqueous sodium hydroxide solution, the resulting mixture extracted with benzene, and the extract washed with water and dried over anhydrous sodium sulfate. After an unsuccessful attempt to effect purification by chromatographing the extract, the resulting benzene eluents were combined and concentrated in vacuo to yield an orange oil.

The oil (5.7 g.) was dissolved in 50 cc. of absolute ethyl alcohol and 2.94 g. of p-toluenesulfonic acid monohydrate was added and dissolved in the solution. The solution was concentrated to yield a gummy material which was taken up in boiling ethyl acetate and the resulting solution was allowed to slowly evaporate to yield a black gummy material. After about three months, crystals were observed in the gum. The gum was then triturated with cold ethyl acetate, yielding a white solid which was crystalized once from ethyl acetate-methanol and once from propionitrile, yielding 4.2 g. of white crystalline product, 3-methyl-4-phenyl-1-[2-(N-phenylpropionamido)ethyl]-4-piperidinol p-toluenesulfonate, M.P. 180.2–181.4° C. (corr.).

*Analysis.*—Calcd. for $C_{22}H_{30}N_2O_2 \cdot C_7H_8O_3S$: C, 66.86; H, 7.11; S, 5.96. Found: C, 67.16; H, 6.79; S, 6.15.

Pharmacological evaluation of 3-methyl-4-phenyl-1-[2-(N-phenylpropionamido)ethyl]-4-piperidinol p-toluenesulfonate in aqueous solution administered to rats subcutaneously using the D'Amour-Smith method has shown that this compound is about twelve times as potent an analgesic as meperidine hydrochloride on a molar basis in terms of bases.

EXAMPLE 6

*4-acetoxy-4-phenyl-1-[2-(N-phenylacetamido)ethyl] piperidine hydrochloride*

A mixture containing 17.7 g. of 4-phenyl-4-piperidinol, 28.1 g. of 2-phenylaminoethyl bromide hydrobromide, 30 g. of sodium carbonate and 200 cc. of n-butanol was refluxed for 24 hours, cooled, filtered and concentrated in vacuo to remove the solvent. The only material was taken up in ethyl acetate and filtered; and the filtrate was concentrated in vacuo to remove the ethyl acetate, thereby yielding, as an oil, the intermediate 4-phenyl-1-(2- phenylaminoethyl)-4-piperidinol. To this intermediate was added 50 cc. acetic anhydride and the resulting reaction mixture was warmed on a steam bath for about five hours and then allowed to stand at room temperature overnight. The reaction mixture was concentrated in vacuo and the residual material was taken up in ether and filtrated. To the ether filtrate was added an ether solution containing hydrogen chloride. The resulting gummy precipitate was separated by decanting the ether and then was triturated with fresh ether whereupon it solidified. The white solid was recrystallized several times from ethyl acetate-methanol and once from isopropyl alcohol to yield 17.2 g. of 4-acetoxy-4-phenyl-1-[2-(N-phenylacetamido)-ethyl]piperidine hydrochloride, M.P. 177.4–185.8° C. (corr.).

Analysis.—Calcd. for $C_{23}H_{28}N_2O_2 \cdot HCl$: Cl, 8.51; N, 6.72. Found: Cl, 8.37; N, 6.65.

Pharmacological evaluation of 4-acetoxy-4-phenyl-1-[2-(N-phenylacetamido)ethyl]piperidine hydrochloride in aqueous solution administered to rats subcutaneously using the D'Amour-Smith method has shown that this compound is about five and one half times as potent an analgesic as meperidine hydrochloride on a molar basis in terms of bases.

4-acetoxy-4-phenyl - 1[2 - (N-phenylacetamido)ethyl] piperidine is obtained in its free base form by dissolving its hydrochloride salt in water, treating the solution with aqueous sodium hydroxide solution, extracting the liberated basic product with benzene, drying the benzene extract over anhydrous sodium sulfate and removing the benzene by distilling in vacuo.

Following the above procedure for the preparation of 4-acetoxy-4-phenyl - 1 - [2-(N - phenylacetamido)ethyl] piperidine hydrochloride using 3-methyl-4-phenyl-4-piperidinol in place of 4-phenyl-4-piperidinol, there is obtained 4-acetoxy-3-methyl-4-phenyl-1-[2-(N - phenylacetamido) ethyl]piperidine hydrochloride.

EXAMPLE 7

*4phenyl-4-propionoxy-1-[2-(N-phenylpropionamido) ethyl]piperidine hydrochloride*

This preparation was carried out following the procedure in Example 6 using 11.6 g. of 4-phenyl-4-piperidinol, 18.5 g. of 2-phenylaminoethyl bromide hydrobromide, 25 g. of sodium carbonate and 100 cc. of n-butanol to yield the intermediate 4-phenyl-1-(2-phenylaminoethyl)-4-piperidinol which was then heated with 75 cc. of propionic anhydride for about six hours and the reaction mixture worked up as in Example 6 to yield the product, 4-phenyl - 4 - propionoxy-1-[2-(N-phenylpropionamido) ethyl]-piperidine hydrochloride, M.P. 184.2–187.2° C. (corr.).

Analysis.—Calcd. for $C_{25}H_{32}N_2O_3 \cdot HCl$: Cl, 7.97; O, 10.78. Found: Cl, 7.80; O, 11.0.

Pharmacological evaluation of 4-phenyl-4-propionoxy-1-[2-(N - phenylpropionamido)ethyl]piperidine hydrochloride in aqueous solution administered to rats subcutaneously using the D'Amour-Smith method has shown that this compound is about two and one half times as potent an analgesic as meperidine hydrochloride on a molar basis in terms of bases.

EXAMPLE 8

*4-phenyl-1-[2-(N-phenylacetamido)ethyl]-4-piperidinol hydrochloride*

A mixture containing 15.5 g. of 4-acetoxy-4-phenyl-1-[2-(N - phenylacetamido)ethyl]piperidine hydrochloride, 25 cc. concentrated hydrochloric acid, 50 cc. of water and 50 cc. of methanol was stirred for four hours at 35° C. The reaction mixture was made basic with aqueous sodium hydroxide solution and the liberated product was extracted with n-butanol. The extract was concentrated in vacuo to remove the solvent and yielded as an oil, 4-phenyl-1-[2-(N-phenylacetamido)ethyl]-4-piperidinol in free base form. This free base was dissolved in ether; and the ether solution, after drying over anhydrous sodium sulfate, was treated with an ether solution of hydrogen chloride. The precipitated white solid was collected and recrystallized several times from methanolethyl acetate. There was thus obtained 2.0 g. of 4-phenyl-1-[2-(N-phenylacetamido)ethyl]-4-piperidinol hydrochloride, M.P. 172.2–176.6° C. (corr.).

Analysis.—Calcd. for $C_{21}H_{26}N_2O_2 \cdot HCl$: Cl, 9.46; N, 7.47. Found: Cl, 9.30; N, 7.17.

Pharmachological evaluation of 4-phenyl-1-[2-(N-phenylacetamido)ethyl,]-4-piperidinol hydrochloride in aqueous solution administered to rats subcutaneously using the D'Amour-Smith method has shown that this compound is about six times as potent an analgesic as meperidine hydrochloride on a molar basis in terms of bases.

Other representative 1-[N-(lower-aromatic)-N-(lower-carboxylic-acyl)amino-(polycarbon-lower - alkyl)] - 4-(lower-aryl)-4-piperidinols and corresponding 4-(lower-carboxylic-acyl) esters that can be prepared according to the foregoing procedures using the corresponding 4-(lower-aryl)-1-[(lower-aromatic-amino)-(polycarbon - lower-alkyl)]-4 - piperidinol and appropriate lower-carboxylic acylating agent (one molar equivalent quantity for the 4-piperidinol and two molar equivalent quantities for the corresponding ester) are the following compounds of Examples 9–33, 35–40, 42–43, and 46–50. These compounds can be isolated in their free base form or in the form of their acid-addition salts, preferably their hydrochloride, as illustrated.

EXAMPLE 9

1-[2-(N-2 - methoxyphenylpropionamido)ethyl] - 4-phenyl-4-piperidinol hydrochloride is obtained following the procedure described in Example 1 using 1-[2-(2-methoxyphenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-2-methoxyphenylpropionamido)ethyl] - 4 - phenyl - 4 - propionoxy-piperidine hydrochloride.

EXAMPLE 10

1-[2-(N-3-ethoxyphenylpropionamido)ethyl]-4-phenyl-4-piperidinol hydrochloride is obtained following the procedure described in Example 1 using 1-[2-(3-ethoxyphenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-3-ethoxyphenylpropionamido)ethyl]-4-phenyl-4-propionoxypiperidine hydrochloride.

EXAMPLE 11

4-phenyl-1-[2-(N - 3,4,5 - trimethoxyphenylpropionamido)ethyl]-4-piperidinol hydrochloride is obtained following the procedure described in Example 1 using 4-phenyl-1-[2-(3,4,5 - trimethoxyphenylamino)ethyl] - 4-piperidinol and one molar equivalent quantity of propionic anhydride. Using the same piperidinol with two molar equivalent quantities of propionic anhydride and following the procedure described in Example 6, there is obtained 4-phenyl-4-propionoxy-1-[2-(N - 3,4,5 - trimethoxyphenylpropionamido)ethyl]piperidine hydrochloride.

EXAMPLE 12

1-[2-(N-2,4 - dimethylphenylpropionamido)ethyl] - 4-phenyl-4-piperidinol hydrochloride is obtained following the procedure described in Example 1 using 1-[2-(2,4-dimethylphenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-2,4-dimethylphenylpropionamido)ethyl]-4-phenyl - 4 - propionoxypiperidine hydrochloride.

EXAMPLE 13

1-[3-(N-2-chloro - 4 - ethoxyphenylpropionamido)propyl]-4-phenyl-4-piperidinol hydrochloride is obtained following the procedure described in Example 1 using 1-[3-(2-chloro-4-ethoxyphenylamino)propyl]-4 - phenyl - 4-piperidinol and one molar equivalent quantity of propionic anhydride. Using the same piperidinol with two molar equivalent quantities of propionic anhydride and following the procedure described in Example 6, there is obtained 1-[3-(N-2-chloro-4 - ethoxyphenylpropionamido)propyl]-4-phenyl-4-propionoxypiperidine hydrochloride.

EXAMPLE 14

1-[2-(N-4-chlorophenylpropionamido)ethyl]-4-phenyl-4-piperidinol hydrochloride is obtained following the procedure described in Example 1 using 1-[2-(4-chlorophenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-4-chlorophenylpropionamido)ethyl]-4-phenyl-4-propionoxypiperidine hydrochloride.

EXAMPLE 15

1-[2-(N-4-n-butylaminophenylpropionamido)ethyl] - 4-phenyl-4-piperidinol hydrochloride is obtained by reacting 1-[2-(N-4-aminophenylpropionamido)ethyl]-4-phenyl - 4-piperidinol hydrochloride with n-butyraldehyde and a reducing agent effective in reductive alkylations using aliphatic aldehydes, e.g., iron and acetic acid or hydrogen and Raney nickel.

EXAMPLE 16

1 - [2 - (N - 4 - methylmercaptophenylpropionamido)ethyl]-4-phenyl-4-piperidinol hydrochloride is obtained following the procedure described in Example 1 using 1-[2-(4-methylmercaptophenylamino)ethyl]-4-phenyl-4 - piperidinol and one molar molar equivalent quantity of propionic anhydride. Using the same piperidinol with two molar equivalent quantities of propionic anhydride and following the procedure described in Example 6, there is obtained 1-[2-(N - 4 - methylmercaptophenylpropionamido)ethyl]-4-phenyl-4-propionoxypiperidine hydrochloride.

EXAMPLE 17

4-phenyl-1-[3-(N-4 - n - propylsulfinylphenylpropionamido)propyl] - 4 - piperidinol hydrochloride is obtained following the procedure described in Example 1 using 4-phenyl-1-[3-(4-n-propylsulfinylphenylamino)propyl] - 4-piperidinol and one molar equivalent quantity of propionic anhydride. Using the same piperidinol with two molar equivalent quantities of propionic anhydride and following the procedure described in Example 6, there is obtained 4-phenyl-4-propionoxy-1-[3-(N-4-n-propylsulfinylpropionamido)propyl]piperidine hydrochloride.

EXAMPLE 18

1-[2-(N-4-n - butylsulfonylphenylacetamido)ethyl] - 4-phenyl-4-piperidinol hydrochloride is obtained following the procedure described in Example 1 using 1-[2-(4-n-butylsulfonylphenylamino)ethyl]-4-phenyl-4 - piperidinol and one molar equivalent quantity of acetic anhydride. Using the same piperidinol with two molar equivalent quantities of acetic anhydride and following the procedure described in Example 6, there is obtained 4-acetoxy-1-[2-(N-4-n - butylsulfonylphenylacetamido)ethyl] - 4-phenylpiperidine hydrochloride.

EXAMPLE 19

1-[2-(N-4-acetylaminophenylpropionamido)ethyl] - 4-phenyl-4-piperidinol hydrochloride is obtained following the procedure described in Example 1 using 1-[2-(4-acetylaminophenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[N-4-acetylaminophenylpropionamido)ethyl]-4-phenyl-4 - propionoxypiperidine hydrochloride.

EXAMPLE 20

1-[2-(N-2-naphthylpropionamido)ethyl]-4-phenyl - 4-piperidinol hydrochloride is obtained following the procedure described in Example 1 using 1-[2-(2-naphthylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-2-naphthylpropionamido)ethyl]-4-phenyl-4-propionoxypiperidine hydrochloride.

EXAMPLE 21

1 - [2 - (N - 1 - biphenylylpropionamido)ethyl] - 4-phenyl-4-piperidinol hydrochloride is obtained following the procedure described in Example 1' using 1-[2-(1-biphenylylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-1-biphenylylpropionamido)ethyl] - 4 - phenyl - 4 - propionoxypiperidine hydrochloride.

EXAMPLE 22

1 - [3 - (N - 2 - furylacetamido)propyl] - 4 - phenyl - 4-piperidinol hydrochloride is obtained following the procedure described in Example 1 using 1-[3-(2-furylamino)propyl]-4-phenyl-4-piperidinol and one molar equivalent quantity of acetic anhydride. Using the same piperidinol with two molar equivalent quantities of acetic anhydride and following the procedure described in Example 6, there is obtained 4-acetoxy-1-[3-(N-2-furylacetamido)propyl]-4-phenylpiperidine hydrochloride.

EXAMPLE 23

4 - phenyl - 1 - [2 - (N - 4 - pyridylpropionamido)-ethyl]-4-piperidinol dihydrochloride is obtained following the procedure described in Example 1 using 4-phenyl-1-[2-(4-pyridylamino)ethyl]-4-piperidinol and one molar equivalent quantity of propionic anhydride. Using the same piperidinol with two molar equivalent quantities of propionic anhydride and following the procedure described in Example 6, there is obtained 4-phenyl-4-propionoxy-1-[2-(N-4-pyridylpropionamido)ethyl]piperidine dihydrochloride.

EXAMPLE 24

4 - phenyl - 1 - [2 - (N - 3 - pyridyl - 3 - methoxypropanoylamido)ethyl]-4-piperidinol dihydrochloride is obtained following the procedure described in Example 1 using 4 - phenyl - 1 - [2 - (3 - pyridylamino)ethyl] - 4-piperidinol and one molar equivalent quantity of 3-methoxy-propanoic anhydride. Using the same piperidinol with two molar equivalent quantities of 3-methoxypropanoic anhydride and following the procedure described in Example 6, there is obtained 4-(3-methoxypropanoyloxy - 4 - phenyl - 1 - [2 - (N - 3 - pyridyl - 3 - methoxypropanoylamido)-ethyl]piperidine dihydrochloride.

EXAMPLE 25

4 - phenyl - 1 - [3 - (N - 2 - thienylpropionamido)-propyl]-4-piperidinol hydrochloride is obtained following the procedure described in Example 1 using 4-phenyl-1-[3-(2-thienylamino)propyl]-4-piperidinol and one molar equivalent quantity of propionic anhydride. Using the same piperidinol with two molar equivalent quantities of propionic anhydride and following the procedure described in Example 6, there is obtained 4-phenyl-4-propionoxy - 1 - [3 - (N - 2 - thienylpropionamido)propyl]-piperidine hydrochloride.

EXAMPLE 26

4 - phenyl - 1 - [2 - (N - 2 - pyrimidylacetamido)-ethyl]-4-piperidinol hydrochloride is obtained following the procedure described in Example 1 using 4-phenyl-1-[2-(2-pyrimidylamino)ethyl]-4-piperdinol and one molar equivalent quantity of acetic anhydride. Using the same piperidinol with two molar equivalent quantities of acetic anhydride and following the procedure described in Example 6, there is obtained 4-acetoxy-4-phenyl-1-[2-(N-2-pyrimidylacetamido)ethyl]piperidine hydrochloride.

EXAMPLE 27

4 - phenyl - 1 - [2 - (N - 2 - thiazolylpropionamido)-ethyl]-4-piperidinol hydrochloride is obtained following the procedure described in Example 1 using 4-phenyl-1-[2-(2-thiazolylamino)ethyl]-4-piperidinol and one molar equivalent quantity of propionic anhydride. Using the same piperidinol with two molar equivalent quantities of propionic anhydride and following the procedure described in Example 6, there is obtained 4-phenyl-4-propionoxy - 1 - [2 - (N - 2 - thiazolylpropionamido)ethyl]-piperidine hydrochloride.

EXAMPLE 28

4 - phenyl - 1 - [4 - (N - phenylpropionamido)butyl]-4-piperidinol hydrochloride is obtained following the procedure described in Example 1 using 4-phenyl-1-(4-phenylaminobutyl)-4-piperidinol and one molar equivalent quantity of propionic anhydride. Using the same piperidinol with two molar equivalent quantities of propionic anhydride and following the procedure described in Example 6, there is obtained 4-phenyl-1-[4-(N-phenylpropionamido)-butyl]-4-propionoxypiperidine hydrochloride.

EXAMPLE 29

4 - phenyl - 1 - [5 - (N - phenylpropionamido)pentyl]-4-piperidinol hydrochloride is obtained following the procedure described in Example 1 using 4-phenyl-1-(5-phenylaminopentyl)-4-piperidinol and one molar equivalent quantity of propionic anhydride. Using the same piperidinol with two molar equivalent quantities of propionic anhydride and following the procedure described in Example 6, there is obtained 4-phenyl-1-[5-(N-phenylpropionamido) - pentyl] - 4 - propionoxyperidine hydrochloride.

EXAMPLE 30

4 - phenyl - 1 - [6 - (N - phenylacetamido)hexyl] - 4-piperidinol hydrochloride is obtained following the procedure described in Example 1 using 4-phenyl-1-(6-phenylaminohexyl)-4-piperidinol and one molar equivalent quantity of acetic anhydride. Using the same piperidinol with two molar equivalent quantities of acetic anhydride and following the procedure described in Example 6, there is obtained 4 - acetoxy - 4 - phenyl - 1 - [6 - (N - phenylacetamido)hexyl]piperidine hydrochloride.

EXAMPLE 31

4 - phenyl - 1 - [2 - (N - phenylpropionamido)propyl]-4-piperidinol hydrochloride is obtained following the procedure described in Example 1 using 4-phenyl-1-(2-phenylaminopropyl)-4-piperidinol and one molar equivalent quantity of propionic anhydride. Using the same piperidinol with two molar equivalent quantities of propionic anhydride and following the procedure described in Example 6, there is obtained 4-phenyl-1-[2-(N-phenylpropionamido)propyl] - 4 - propionoxypiperidine hydrochloride.

EXAMPLE 32

4-phenyl - 1 - [3-(N-phenylpropionamido)-2-propyl]-4-piperidinol hydrochloride is obtained following the procedure described in Example 1 using 4-phenyl-1-(3-phenyl-1-(3-phenylamino-2-propyl)-4-piperidinol and one molar equivalent quantity of propionic anhydride. Using the same piperidinol with two molar equivalent quantities of propionic anhydride and following the procedure described in Example 6, there is obtained 4-phenyl-1-[3-(N-phenylpropionamido) - 2-propyl]-4-propionoxypiperidine hydrochloride.

EXAMPLE 33

1 - [2-(N-4-nitrophenylpropionamido)ethyl]-4-phenyl-4-piperidinol hydrochloride is obtained following the procedure described in Example 1 using 1-[2-(4-nitrophenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-4-nitrophenylpropionamido)ethyl]-4-phenyl-4-propionoxypiperidine hydrochloride.

EXAMPLE 34

1-[2-(N-4-aminophenylpropionamido)ethyl] - 4 - phenyl-4-piperidinol hydrochloride and 1-[2-(N-4-aminophenylpropionamido) - ethyl]-4-phenyl-4-propionoxypiperidine hydrochloride are obtained by reacting the corresponding respective 4-nitrophenyl compounds of Example 33 with a reducing agent effective to reduce intro groups to amino groups, e.g., iron and hydrochloric acid.

EXAMPLE 35

1 - [2 - (N-2-oxazolylpropionamido)ethyl]-4-phenyl-4-piperidinol hydrochloride is obtained following the procedure described in Example 1 using 1-[2-(2-oxazolylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-2-oxalolylpropionamido)ethyl]-4-phenyl-4-propionoxypiperidine hydrochloride.

EXAMPLE 36

4-phenyl-1-[3-(N-2-triazinylacetamido)propyl] - 4 - piperidinol hydrochloride is obtained following the procedure described in Example 1 using 4-phenyl-1-[3-(2-triazinylamino)propyl]-4-piperidinol and one molar equivalent quantity of acetic anhydride. Using the same piperidinol with two molar equivalent quantities of acetic anhydride and following the procedure described in Example 6, there is obtained 4-acetoxy-4-phenyl-1-[3-(N-2-triazinylacetamido)propyl]piperidine hydrochloride.

EXAMPLE 37

4 - phenyl-1-[2-(N-2-pyridylpropionamido)ethyl]-4-piperidinol dihydrochloride is obtained following the procedure described in Example 1 using 4-phenyl-1-[2-(2-pyridylamino)ethyl]-4-piperidinol and one molar equivalent quantity of propionic anhydride. Using the same piperidinol with two molar equivalent quantities of propionic anhydride and following the procedure described in Example 6, there is obtained 4-phenyl-1-[2-(N-2-pyridylpropionamido)ethyl]-4-propionoxypiperidine dihydrochloride.

EXAMPLE 38

4 - phenyl - 1-[2-(N-3-trifluoromethylphenylpropionamido)-ethyl]-4-piperidinol hydrochloride is obtained following the procedure described in Example 1 using 4-phenyl - 1-[2-(3-trifluoromethylphenylamino)ethyl]-4-piperidinol and one molar equivalent quantity of propionic anhydride. Using the same piperidinol with two molar equivalent quantities of propionic anhydride and following the procedure described in Example 6, there is obtained 4 - phenyl-4-propionoxy-1-[2-(N-3-trifluoromethylphenylpropionamido)-ethyl]piperidine hydrochloride.

EXAMPLE 39

4 - phenyl - 1-[2-(N-4-phenoxyphenylmethoxyacetamido)ethyl]-4-piperidinol hydrochloride is obtained following the procedure described in Example 1 using 4-phenyl-1-[2-(4-phenoxyphenylamino)-ethyl]-4 - piperidinol and one molar equivalent quantity of methoxyacetic anhydride. Using the same piperidinol with two molar equivalent quantities of methoxyacetic anhydride and following the procedure described in Example 6, there is obtained 4-acetoxy-4-phenyl-1-[2-(N-4 - phenoxyphenylmethoxyacetamido)ethyl]piperidine hydrochloride.

EXAMPLE 40

1 - [2 - (N-3-benzyloxyphenylpropionamido)ethyl]-4-phenyl-4-piperidinol hydrochloride is obtained following the procedure described in Example 1 using 1-[2-(3-benzyloxyphenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-3 - benzyloxyphenylpropionamido)ethyl]-4-phenyl-4-propionoxypiperidine hydrochloride.

EXAMPLE 41

1 - [2 - (N-3-hydroxyphenylpropionamido)ethyl]-4-phenyl - 4 - piperidinol hydrochloride and 1-[2-(N-3-hydroxyphenylpropionamido)-ethyl]-4-phenyl-4-propionoxypiperidine hydrochloride are obtained by reacting the corresponding respective 3-benzyloxyphenyl compounds of Example 40 with hydrogen under pressure in the presence of a catalyst, e.g., platinum oxide, i.e., under catalytic hydrogenation conditions effective to debenzylate the benzyloxy group.

EXAMPLE 42

4 - phenyl-1-[3-(N-4-phenylmercaptophenylacetamido)propyl]-4-piperidinol hydrochloride is obtained following the procedure described in Example 1 using 4-phenyl-1-[3-(4-phenylmercaptophenylamino)propyl]-4 - piperidinol and one molar equivalent quantity of acetic anhydride. Using the same piperidinol with two molar equivalent quantities of acetic anhydride and following the procedure described in Example 6, there is obtained 4-acetoxy-4-phenyl - 1-[3-(N-4-phenylmercaptophenylacetamido)propyl]piperidine hydrochloride.

EXAMPLE 43

1 - [2 - (N - 4 - benzylphenylpropionamido)ethyl] - 4-phenyl-4-piperidinol hydrochloride is obtained following the procedure described in Example 1 using 1-[2-(4-benzylphenylamino)ethyl]-4-phenyl-4-piperidinol and one molar equivalent quantity of propionic anhydride. Using the same piperidinol with two molar equivalent quantities of propionic anhydride and following the procedure described in Example 6, there is obtained 1-[2-(N-4-benzylphenylpropionamido)ethyl] - 4 - phenyl - 4 - propionoxypiperidine hydrochloride.

EXAMPLE 44

4-acetoxy - 4 - phenyl - 1 - [2-(N-phenylpropionamido)ethyl]-4-piperidinol hydrochloride is obtained by heating 4-phenyl-1-[2-(N-phenylpropionamido)ethyl] - 4 - piperidinol with one molar equivalent quantity of acetic anhydride following the procedure described in Example 6.

EXAMPLE 45

4-phenyl-1-[2-(N - phenylacetamido)ethyl] - 4 - propionoxypiperidine hydrochloride is obtained by heating 4-phenyl-1-[2-(N-phenylacetamido)ethyl] - 4 - piperidinol with one molar equivalent quantity of propionic anhydride following the procedure described in Example 6.

EXAMPLE 46

4-(2-naphthyl) - 1 - [2-(N-phenylpropionamido)ethyl]-4-piperidinol hydrochloride is obtained following the procedure described in Example 1 using 4-(2-naphthyl)-1-(2-phenylaminoethyl)-4-piperidinol and one molar equivalent quantity of propionic anhydride. Using the same piperidinol with two molar equivalent quantities of propionic anhydride and following the procedure described in Example 6, there is obtained 4-(2-naphthyl)-1-[2-(N-phenylpropionamido)ethyl]-4-propionoxy piperidine hydrochloride.

EXAMPLE 47

4-(3-methoxyphenyl) - 1 - [3-(N-phenylpropionamido)propyl]-4-piperidinol hydrochloride is obtained following the procedure described in Example 1 using 4-(3-methoxyphenyl)-1-(2-phenylaminoethyl)-4-piperidinol and one molar equivalent quantity of propionic anhydride. Using the same piperidinol with two molar equivalent quantities of propionic anhydride and following the procedure described in Example 6, there is obtained 4-(3-methoxyphenyl)-1-[3-(N - phenylpropionamido)propyl] - 4 - propionoxypiperidine hydrochloride.

EXAMPLE 48

1-[3-(N - phenylacetamido)propyl] - 4 - (p-tolyl)-4-piperidinol hydrochloride is obtained following the procedure described in Example 1 using 1-(2-phenylaminoethyl)-4-(p-tolyl)-4-piperidinol and one molar equivalent quantity of acetic anhydride. Using the same piperidinol with two molar equivalent quantities of acetic anhydride and following the procedure described in Example 6, there is obtained 1-[3-(N - phenylacetoamido)propyl]-4-propionoxy-4-(p-tolyl)piperidine hydrochloride.

EXAMPLE 49

1-[2-(N - 4-dimethylaminophenylpropionamido)ethyl]-4-phenyl-4-piperidinol hydrochloride is obtained following the procedure described in Example 1 using 1-[2-(4-dimethylaminophenylamino)ethyl] - 4 - phenyl-4-piperidinol and one molar equivalent quantity of propionic anhydride. Using the same piperidinol with two molar equivalent quantities of propionic anhydride and following the procedure described in Example 6, there is obtained 1 - [2 - (N - dimethylaminophenylpropionamido)ethyl]-4-phenyl-4-propionoxypiperidine hydrochloride.

EXAMPLE 50

3 - methyl - 4 - phenyl-1-[3-(N-phenylpropionamido)propyl]-4-piperidinol hydrochloride is obtained following the procedure described in Example 1 using 3-methyl-4-phenyl-1-(3-phenylaminopropyl) - 4 - piperidinol and one molar equivalent quantity of propionic anhydride. Using the same piperidinol with two molar equivalent quantities of propionic anhydride and following the procedure described in Example 6, there is obtained 3-methyl-4-phenyl-1-[3 - (N - phenylpropionamido)propyl]propionoxypiperidine hydrochloride.

The 1-[N-(lower-aromatic)-N-(lower-carboxylic-acyl) amino (polycarbon-lower-alkyl)]-4-(lower-aryl)-4-piperidinols and corresponding 4-(lower-carboxylic-acyl) esters of the invention can be formulated in the manner conventional for potent analgesics, e.g., in liquid preparations in an aqueous or aqueous-ethanol menstrum or in solid form, e.g., as tablets or powders. The tablet formulations can be prepared using conventional excipients; and the powders can be dispensed in capsule form. These preparations can be administered orally, or in the case of the aqueous preparations, intramuscularly or subcutaneously.

Subject matter related to the subject matter of this application is disclosed and claimed in the commonly-owned United States patent applications of William F. Wetterau, Serial Number 12,929, filed March 7, 1960, now abandoned, and of Philip M. Carabateas and William F. Wetterau, Serial Number 531,753, filed March 4, 1966, now abandoned.

I claim:
1. An acid-addition salt of a compound having the structural formula

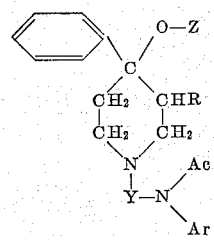

where Ac and Z each represent lower-alkanoyl, R represents lower-alkyl, Y represents polycarbon-lower-alkylene and Ar represents monocarbocyclic-aryl having six ring-carbon atoms.

2. An acid-addition salt of a compound having the structural formula

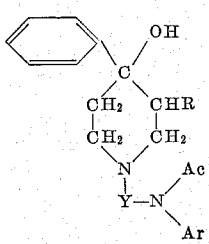

where Ac represents lower-alkanoyl, R represents lower-alkyl, Y represents polycarbon-lower-alkylene and Ar represents monocarbocyclic-aryl having six ring-carbon atoms.

3. An acid-addition salt of 4-(lower-alkanoyloxy)-4-phenyl - 1 - [(N-phenyl-N-lower-alkanoylamino)-(polycarbon-lower-alkyl)]-piperidine.

4. An acid-addition salt of 4-phenyl-1-[(N-phenyl-N-lower - alkanoylamino) - (polycarbon - lower-alkyl)]-4-piperidinol.

5. An acid-addition salt of 3-methyl-4-phenyl-1-[(N-phenyl - N - lower - alkanoylamino) - (polycarbon-lower-alkyl)]-4-piperidinol.

6. An acid-addition salt of 4-phenyl-1-[2-(N-phenyl-propionamido)ethyl]-4-propionoxypiperidine.

7. An acid-addition salt of 4-acetoxy-4-phenyl-1-[2-(N-phenyl-acetamido)ethyl]piperidine.

8. An acid-addition salt of 4-phenyl-1-[2-(N-phenyl-acetamido)ethyl]-4-piperidinol.

9. An acid-addition salt of 4-phenyl-1-[2-(N-phenyl-propionamido)ethyl]-4-piperidinol.

10. An acid-addition salt of 4-phenyl-1-[3-(N-phenyl-propionamido)propyl]-4-piperidinol.

11. An acid-addition salt of 3-methyl-4-phenyl-1-[2-(N-phenyl-propionamido)ethyl]-4-piperidinol.

12. A composition of matter selected from the group consisting of 1-[(mono- and bi-cyclic-aromatic-amino)-(polycarbon - lower-alkyl)]-4-(monocarbocyclic-aryl having six ring-carbon atoms and naphthyl)-4-piperidinol and acid-addition salts thereof.

13. A compound having the structural formula

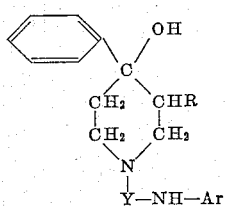

where R represents lower-alkyl, Y represents polycarbon-lower-alkylene and Ar represents monocarbocyclic-aryl having six ring-carbon atoms.

14. An acid-addition salt of the compound of claim 13.

15. An acid-addition salt of 4-phenyl-1-[phenylamino-(polycarbon-lower-alkyl)]-4-piperidinol.

16. An acid-addition salt of 4-phenyl-1-(2-phenylamino-ethyl)-4-piperidinol.

17. An acid-addition salt of a compound having the structural formula

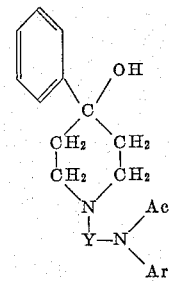

where Ac and Z each represent lower-alkanoyl, Y represents polycarbon-lower-alkylene and Ar represents monocarbocyclic-aryl having six ring-carbon atoms.

18. An acid addition salt of a compound having the structural formula

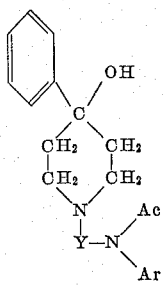

where Ac represents lower-alkanoyl, Y represents polycarbon-lower-alkylene and Ar represents monocarbocyclic-aryl having six ring-carbon atoms.

19. A compound having the structural formula

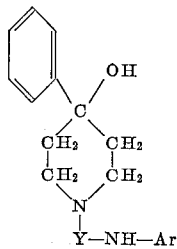

where Y represents polycarbon-lower-alkylene and Ar represents monocarbocyclic-aryl having six ring-carbon atoms.

20. An acid-addition salt of the compound of claim 19.

21. A composition of matter selected from the group consisting of 1-[N-(mono- and bi-cyclic aromatic)-N-(lower - carboxylic - acyl)amino - (polycarbon - lower-alkyl)]-4-(monocarbocyclic-aryl having six ring-carbon atoms and naphthyl)-4-piperidinol, lower-caboxylic-acyl esters thereof, and acid-addition and alkyl, alkenyl, and aralkyl quaternary-ammonium salts of said 4-piperidinol and esters.

References Cited by the Examiner
UNITED STATES PATENTS

| | | | |
|---|---|---|---|
| 2,246,264 | 6/1941 | Pinkernelle | 260—294.3 |
| 2,514,376 | 7/1950 | Crooks et al. | 260—472 |
| 2,781,378 | 2/1957 | Mannheimer | 260—461 |
| 2,824,875 | 2/1958 | Elpern | 260—294.3 |
| 2,846,437 | 8/1958 | Elpern | 260—294.3 |
| 2,850,500 | 9/1958 | Elpern | 260—294.3 |
| 2,880,211 | 3/1959 | Elpern | 260—294.3 |
| 2,960,507 | 11/1960 | Stern et al. | 260—294.3 |

ALEX MAZEL, *Primary Examiner.*

IRVING MARCUS, DUVAL T. McCUTCHEN,
*Examiners.*

J. TOVAR, *Assistant Examiner.*